United States Patent Office 2,693,953
Patented Nov. 9, 1954

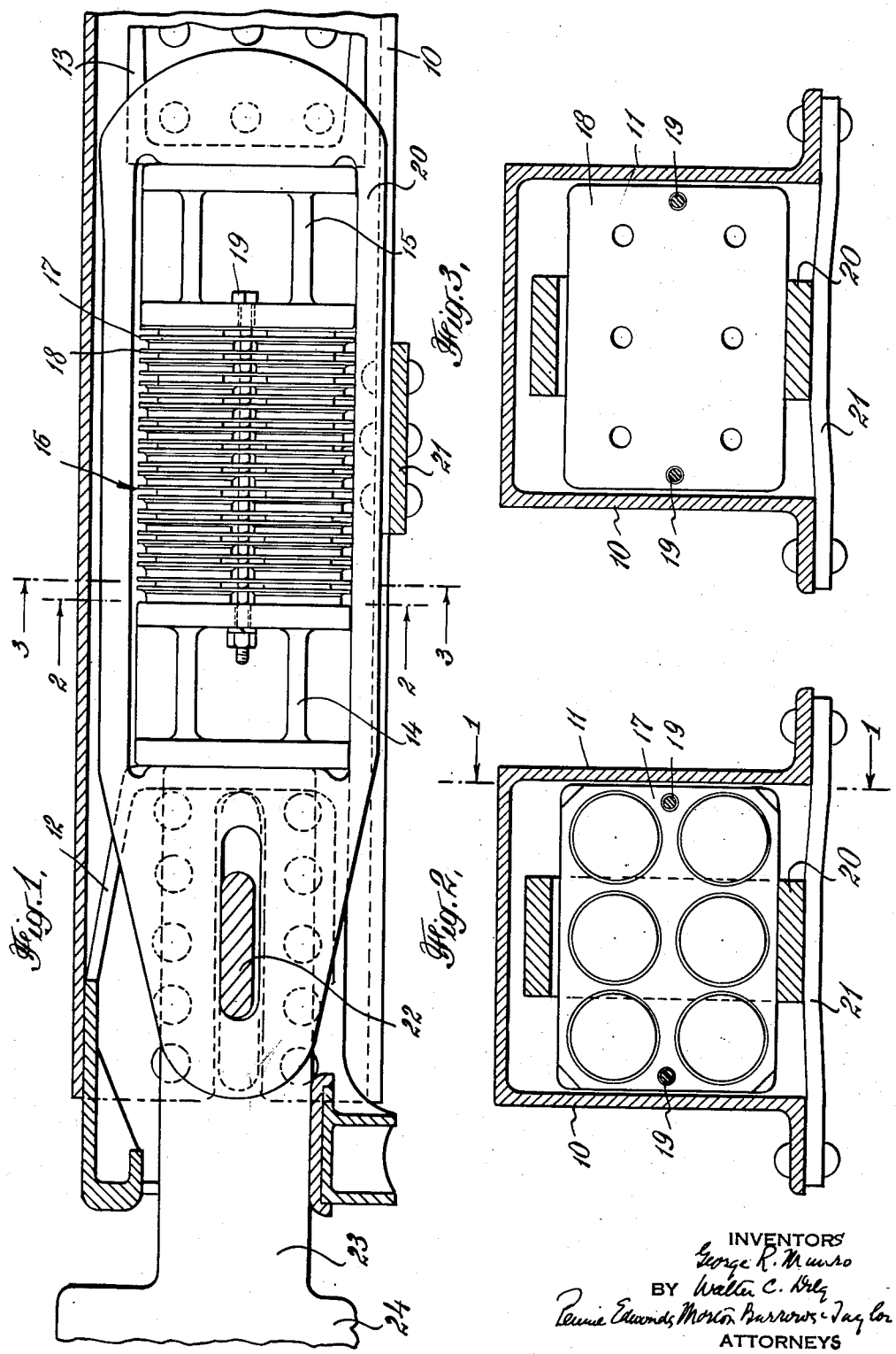

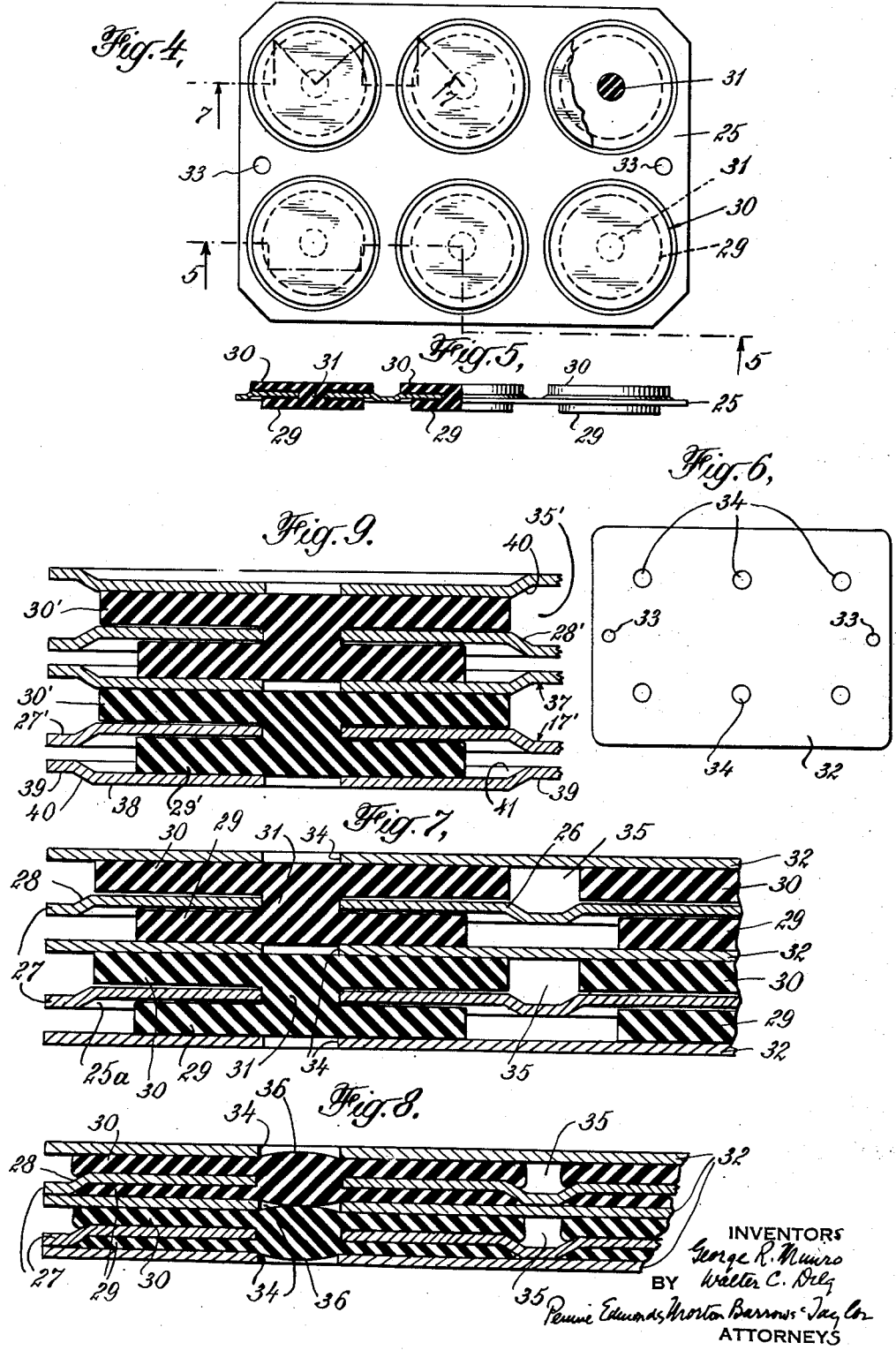

2,693,953

CUSHIONING DEVICE

George R. Munro, Massapequa, and Walter C. Dilg, Hewlett, N. Y., assignors to Waugh Equipment Company, New York, N. Y., a corporation of Maine Application June 11, 1952, Serial No. 292,942

8 Claims. (Cl. 267—1)

This invention relates to cushioning mechanisms of the kind, in which rubber or similar resilient material serves as the active cushioning agent disposed between relatively movable compression members. More particularly, the invention is concerned with a novel resilient element of the type, which may for convenience be referred to as a rubber spring, and with a new cushioning unit, which includes one or more of the springs. The cushioning unit of the invention is especially suitable for use in draft gears on railway vehicles and a form of the new rubber spring and a cushioning unit containing such springs and applicable to railway use will, accordingly, be illustrated and described in detail for purposes of explanation. It will be apparent, however, that the utility of the invention is not limited to the draft gear field and the spring and unit may be employed in other structures as, for example, in shock mounts, buffers, etc.

Rubber springs have heretofore commonly included a metal mounting or center plate and masses of rubber mounted in alignment on opposite faces of the plate. In one such rubber spring, which has been used extensively in draft gears and buffers on railway cars, the rubber masses have the form of rings of generally rectangular section, and the rings are secured on opposite faces of a steel plate by rubber plugs, which extend through openings through the plate and connect aligned rings on opposite sides thereof. Some rubber springs have only a single rubber ring on each side of the center plate, while others include a plurality of spaced concentric rings on each side. In a cushioning unit for use in a draft gear or buffer, a number of such rubber springs are usually mounted in alternation with plain divider plates serving to prevent contact between the rubber masses on adjacent springs. Also, it is common to provide followers of substantial thickness at the ends of such a cushioning unit.

Draft gears containing rubber springs of the type heretofore employed are superior to friction gears, particularly for passenger service, because their action is smoother and more uniform, but the operating characteristics of such rubber gears are not ideal in that a rubber gear, as commonly made, undergoes a relatively large deflection under light loads, so that its travel during the initial part of the cushioning operation may be objectionably long. Also, after a point on the load-deflection curve has been reached, the resistance of a rubber spring increases rapidly per added increment of load. Under heavy loads, therefore, a rubber spring gear may give little cushioning effect.

The present invention is directed to the provision of a novel cushioning unit having all the advantages of prior similar units plus superior operating characteristics and of a novel resilient element or rubber spring for use in such a unit. The new cushioning unit offers substantial resistance to compression under light loads and is thus immediately effective as a load is applied. The new unit may offer a resistance through the initial part of its travel, which is approximately proportional to the load, and the operating characteristics may be varied in accordance with the requirements of the particular application of the unit.

The desirable results obtained by the use of the new unit are derived from the use of the new rubber spring, which, in its simplest form, includes a center plate of dished shape and having a flat main area surrounded by a flat peripheral section offset from the plane of the area and connected thereto by a sloping section, so that the plate has a recess in its front face. Preferably, the main area is circular and the connecting section is frusto-conical, while the outline of the peripheral section varies in accordance with the structure, in which the spring is to be used. A rubber pad lies against the front face of the main area of the plate within the recess and spaced on all sides from the sloping section of the plate. A similar pad larger in cross-section than the first pad lies against the rear face of the main area of the plate and substantially covers that area. The two pads are connected together by at least one rubber plug integral with the pads and extending through an opening in the plate. While the pads are in contact with opposite faces of the central area of the plate, they are not bonded thereto and are held in place only by the plug.

In a cushioning mechanism, in which such rubber springs are employed, the springs are disposed with their recessed sides facing in the same direction and adjacent springs are separated by a flat divider plate. The assembly of springs and divider plates is disposed between opposed flat faces of compression members, of which both may be movable, or one movable and one stationary. With this arrangement, the application through the compression members of a force tending to compress the assembly results in deformation of the rubber pads on the springs. The pad lying against the recessed side of the center plate of each spring has a volume not greater than that of the recess and, as the unit is compressed, the divider plate on the recessed side of each spring ultimately makes contact with the peripheral section of that spring. When this occurs, the application of an additional compressive force is resisted wholly by the larger pad on each spring, and that pad may distort and flow down the surface of the connecting section of the spring, while no further deformation of the smaller pad occurs. By the use of pads of proper dimensions, it is possible to produce rubber springs, which give a cushioning unit containing such springs different operating characteristics.

For a better understanding of the invention, reference may be made to the accompanying drawings, in which Fig. 1 is a view in vertical longitudinal section on the line 1—1 of Fig. 2 of a railway draft gear containing the new cushioning unit;

Figs. 2 and 3 are sectional views on the lines 2—2 and 3—3 of Fig. 1;

Fig. 4 is a plan view with parts broken away of one of the new rubber springs;

Fig. 5 is a sectional view on the line 5—5 of Fig. 4;

Fig. 6 is a plan view of a divider plate used with the new rubber springs;

Fig. 7 is a sectional view on the line 7—7 of Fig. 4 through a pair of rubber springs and divider plates used therewith;

Fig. 8 is a view similar to Fig. 7 showing the assembly of Fig. 7 subjected to compression; and Fig. 9 is a sectional view of a modified construction.

The draft gear employing the new cushioning unit and illustrated in Fig. 1, is installed in a draft pocket between longitudinal sills 10 and 11 of the car, the pocket being defined at opposite ends by pairs of front stops 12 and rear stops 13 riveted to respective sills. The gear comprises a front follower 14 extending across the pocket and seated against front stops 12 and a similar rear follower 15 seated against rear stops 13. A cushioning unit 16 made up of a plurality of rubber springs 17 alternating with divider plates 18 is installed between followers 14, 15, and the followers and cushioning unit are secured together with the cushioning unit under a desired initial compression by means of tie-bolts 19, which pass through aligned openings in the followers, the springs, and the divider plates. The gear lies within a vertical yoke 20, which is supported on a carry iron 21 secured to the bottom flanges of the sills. At its forward end, the yoke is slotted and connected by a key 22 to the shank 23 of a coupler 24.

The cushioning unit 16 is illustrated as made up of 12 rubber springs 17 separated by 11 divider plates 18, the end springs making contact with the opposed inner faces of followers 14, 15. Each rubber spring comprises a center plate 25, which is made of metal and is provided with a number of main areas 26, surrounded by respective peripheral sections 27 lying in a common plane and connected to their main sections by connecting sections 28. The center plate of the spring illustrated in Fig. 4 is of oblong shape with the corners cut off, and it is provided with six main areas lying in a common plane and arranged in two rows of three each. Each main area is circular in shape, so that the connecting section connecting each main area to its peripheral section is frusto-conical. With this arrangement, the plate is formed with a number of recesses, each of which is surrounded by a sloping section and a flat peripheral section.

A plurality of rubber pads 29 are mounted in respective recesses in contact with the front face of the center plate, and the pads are alike in size and shape and of less cross-sectional area than their respective main areas. In the construction shown, in which the main areas are circular, the pads 29 are cylindrical and each pad has a diameter substantially less than its related main area. A similar pad 30 of greater cross-sectional area than a pad 29 is applied against the rear face of each main area and each pad 30 is coaxial with its related pad 29 and connected thereto by a plug 31 of rubber, which is integral with the pads and extends through a central opening through the main area between the pads. The pads of each pair are not bonded to the center plate, but are held in close contact therewith by the plug connecting them. Each pad 30 has a cross-sectional side substantially the same as that of the main area against which it lies. Each pad 29 has a volume not greater than that of the recess in the center plate within which it lies.

Each of the divider plates 32 separating adjacent rubber springs in the cushioning unit 16 is an oblong metal plate of approximately the same size as the center plates 25 of the rubber springs, and each divider plate has openings 33 for the passage of bolts 18. If desired, each divider plate may also have openings 34 lying coaxially in the cushioning unit 16 with pairs of rubber pads of the adjacent rubber springs, the openings 34 being of substantially less cross-sectional area than the pads.

In assembling the cushioning unit, the rubber springs are disposed with their recessed surfaces all facing in the same direction, and each divider plate is normally spaced from the peripheral sections 27 of the adjacent rubber springs. When a force, for example, in buff, is applied to the yoke 20 through the coupler, the forward end of the yoke moves to the rear advancing the front follower 14 with it. Follower 14 then compresses cushioning unit 16 against the rear follower 15, which is held in place by the rear stops 13. When the compressive force is initially applied to the cushioning unit, the force is resisted by the rubber pads 29, 30 on opposite sides of each rubber spring. As a result, the pads become distorted and flattened and the pads 30 begin to flow over the edges of the main areas of the center plate, with which they are in contact. Similarly, the pads 29 begin to flow laterally within the recesses in their center plates. As the overall length of the cushioning unit 16 is decreased with the deformation of the rubber pads, as explained, the peripheral sections 27 on each center plate ultimately make contact with the divider plate 32, toward which those sections are offset. Such contact is possible, because, as each pad 29 is deformed under load and flows laterally within its recess, the pad cannot flow out of the recess, because the volume of the pad is not greater than that of the recess.

As soon as the peripheral sections of the springs make contact with the adjacent divider plates, as shown in Fig. 8, the application of a further load to the cushioning unit is resisted only by the pads 30 on the respective springs and these pads flow down the connecting sections and into the spaces between the center plate of their spring and the divider plate, with which the pads contact. The peripheral sections are of sufficient width to provide spaces 35 between the center plate of each spring and the divider plate engaging the pads 30 of that spring, into which the rubber and the pads may flow under load without making contact with adjacent pads. When the applied force is released, the pads expand and restore the unit to its original overall length with both followers 14, 15 in contact with their associated pairs of stops. In such expansion of the pads, they resume their original shape, as shown in Fig. 7.

During the application of a compressive force to the cushioning unit 16, portions 36 of the pads on the springs may flow into the openings 34 aligned therewith in adjacent divider plates 32. The projecting portions 36 of the pads thus serve to keep the springs and divider plates aligned. In the drawings, particularly Fig. 7, the marginal portions of the rubber masses have been illustrated as separate from the center plate, but this separation is intended to indicate merely that the pads are not bonded to the center plate. In practice, the pads lie in contact with the center plate, but are free therefrom. Because there is no bonding between the rubber pads and the center plate, a substantial amount of any force applied to a rubber spring is dissipated as friction between the pads and the center plate and is not merely stored in the pads for subsequent release.

In the construction shown in Fig. 7, the divider plates 32 are flat and, when the assembly is compressed, until each divider plate makes contact with the peripheral sections 27 of an adjacent rubber spring, as described, each pad 29 is confined within a relatively small volume. Because of that, pads 29 must be rather short. If desired, the flat divider plates may be replaced by plates 37 (Fig. 9), which are similar to the center plates 25, in that each plate 37 has main areas 38 surrounded by offset peripheral sections 39 lying in a common plane and connected to their main sections by connecting sections 40, so that each plate 37 has a plurality of recesses 41 in one face. When divider plates 37 are employed with rubber springs 17' similar to springs 17, plates 37 are disposed, so that their recesses 41 face the recesses on the adjacent spring containing pads 29' corresponding to pads 29. With this arrangement, compression of the assembly until the peripheral sections 39 of each divider plate engage the peripheral sections 27' of the adjacent spring causes pads 29' to be confined within a volume greater than that, on which a pad 29 is confined under similar conditions, as shown in Fig. 8. The use of divider plates 37 thus permits use of rubber springs having pads of increased height in the recesses in the center plates and a draft gear made up of such springs and divider plates may have a softer initial action than one, in which flat divider plates are employed and the pads in the center plate recesses are of less height.

When the assembly of springs and divider plates shown in Fig. 7 is subjected to compression and pads 30 begin to flow into spaces 35, the area of the divider plate applying pressure to each pad increases. When the assembly shown in Fig. 9 is compressed, the portion of each pad 30', which flows into a space 35', lies between a surface 28' on a center plate and a surface 40 on a divider plate. As these surfaces diverge, little pressure is applied through them to the pad and the pad may be considered to be compressed over an area remaining constant.

By properly proportioning the depth of the recesses or cup in the center plates or in both center and divider plates and the shape of the pads in the center plate recesses, the operating characteristics of a draft gear made up of the new springs and divider plates may be varied, as desired.

The rubber springs illustrated include six sets of pads with each pad connected through the center plate with its related pad by a central rubber plug. In rubber springs for some purposes, it is sufficient to employ a single pad on each face of the center plate. Also, the aligned pads on the spring may be connected together by a single plug or by a plurality of plugs, as may be desired.

It is to be understood that the resilient masses 29 and 30 of the springs may be made of natural or synthetic rubber or rubber compositions or any other suitable resilient material, and the term "rubber" has been used for convenience to refer to all such materials.

We claim:

1. A cushioning unit, which comprises a plurality of like rubber springs arranged in alternation with divider plates, each rubber spring being made of a metal plate having at least one flat main section offset from the plane of the remainder of the plate to provide a recess in the front side of the plate, a rubber pad of substantially less cross-sectional area than the area of said main section mounted against the face of said main section within the recess, a rubber pad of substantially the same cross-sectional area as the area of said main section mounted against the rear face of the main section and in alignment with the first pad, and at least one plug of rubber connecting the pads through an opening through said main section, the rubber springs being disposed with their rubber pads aligned and their recesses facing in the same direction, and each divider plate comprising at least one main section offset from the plane of the remainder of the plate to provide a recess in one side of the plate, the divider plate being disposed with its recess facing that in the metal plate of the rubber spring and with the rubber pad engaging the metal plate within the recess thereof also engaging the bottom of the recess in the divider plate.

2. A rubber spring, which comprises a sheet metal plate having at least one recess in its front face, the recess being defined by a flat main section and a sloping section connecting the main section to the remainder of the plate, the recess being completely surrounded by a flat peripheral section of the plate, a flat solid rubber pad lying against the front face of the main section within the recess and centered with said main section, the periphery of the pad being spaced inwardly from the sloping section and the pad having a volume not exceeding that of the recess, a second flat solid rubber pad lying against the rear surface of the main section coaxially with the first pad, the second pad substantially entirely covering said rear surface, and at least one rubber plug connected to the pads and extending through the main section of the plate.

3. A rubber spring as defined in claim 2, in which the main section of the plate is circular in outline and the rubber pads are cylindrical.

4. A rubber spring, which comprises a sheet metal plate having a plurality of recesses in its front face, each recess being defined by a flat main section and a sloping section connecting the main section to the remainder of the plate, each recess being completely surrounded by a flat peripheral section of the plate and the main sections of the recesses lying in a common plane, a flat solid rubber pad lying against the front face of the main section within each recess and centered with said main section, the periphery of the pad being spaced inwardly from the sloping section of said recess and the pad having a volume not exceeding that of the recess, a second flat solid rubber pad lying against the rear surface of the main section of each recess coaxially with the first pad, the second pad substantially entirely covering said rear surface with which it is in contact, and at least one rubber plug extending through each main section of the plate and connected to the pads in contact with opposite faces of the main section.

5. A rubber spring, as defined in claim 4, in which each main section of the plate is circular in outline and the rubber pads are cylindrical.

6. A cushioning unit which comprises a plurality of like rubber springs arranged in alternation with divider plates, each rubber spring being made of a sheet metal plate having at least one recess in its front face, the recess being defined by a flat main section and a sloping section connecting the main section to the remainder of the plate, the recess being completely surrounded by a flat peripheral section of the plate, a flat solid rubber pad lying against the front face of the main section within the recess and centered with said main section, the periphery of the pad being spaced inwardly from the sloping section, the pad having a volume not exceeding that of the recess and normally projecting from said recess, a second flat solid rubber pad lying against the rear surface of the main section coaxially with the first pad, the second pad substantially entirely covering said rear surface, and at least one rubber plug connected to the pads and extending through the main section of the plate, the pads on opposite faces of each rubber spring being engaged by the divider plates on opposite sides of the spring.

7. A cushioning unit, as defined in claim 6, in which each main section of the plates of the springs is circular in outline and the rubber pads are cylindrical.

8. A cushioning unit, as defined in claim 6, which comprises a follower at each end of the group of springs and divider plates and tie-bolts extending through openings through the followers, divider plates, and the metal plates of the springs and holding the parts of the unit together.

References Cited in the file of this patent

UNITED STATES PATENTS

| Number | Name | Date |
|---|---|---|
| 546,831 | Spencer | Sept. 24, 1895 |
| 1,828,063 | Mussey | Oct. 20, 1931 |
| 2,267,475 | Miller | Dec. 23, 1941 |
| 2,575,491 | Dath | Nov. 20, 1951 |